US007346841B2

(12) United States Patent
Kuruoglu et al.

(10) Patent No.: US 7,346,841 B2
(45) Date of Patent: Mar. 18, 2008

(54) METHOD AND APPARATUS FOR COLLABORATIVE ANNOTATION OF A DOCUMENT

(75) Inventors: Ercan E. Kuruoglu, Pisa (IT); Alex S. Taylor, Ascot (GB); Mauritius Seeger, Royston (GB); Stuart A. Taylor, Cambridge (GB)

(73) Assignee: Xerox Corporation, Norwalk, CT (US)

( * ) Notice: Subject to any disclaimer, the term of this patent is extended or adjusted under 35 U.S.C. 154(b) by 1269 days.

(21) Appl. No.: 09/738,992

(22) Filed: Dec. 19, 2000

(65) Prior Publication Data

US 2002/0078088 A1 Jun. 20, 2002

(51) Int. Cl.
*G06F 15/00* (2006.01)
*G06F 17/00* (2006.01)

(52) U.S. Cl. .................. 715/512; 715/541; 709/219; 358/505

(58) Field of Classification Search ........... 345/863, 345/358, 751; 715/512, 541; 382/9, 219; 709/250, 206, 219; 358/505
See application file for complete search history.

(56) References Cited

U.S. PATENT DOCUMENTS

| 5,220,657 | A |   | 6/1993  | Bly et al. .............. 395/425 |
| 5,384,863 | A |   | 1/1995  | Huttenlocher et al. ...... 382/9 |
| 5,583,993 | A |   | 12/1996 | Foster et al. ............ 395/200 |
| 5,680,636 | A | * | 10/1997 | Levine et al. ........... 715/512 |
| 5,692,073 | A | * | 11/1997 | Cass .................... 382/219 |
| 5,781,727 | A |   | 7/1998  | Carleton et al. ......... 395/200 |
| 5,781,732 | A |   | 7/1998  | Adams .................. 395/200 |
| 5,826,025 | A |   | 10/1998 | Gramlich ............... 395/200 |
| 5,897,648 | A |   | 4/1999  | Henderson ............... 707/530 |
| 6,054,990 | A | * | 4/2000  | Tran ...................... 345/863 |
| 6,342,906 | B1 | * | 1/2002 | Kumar et al. ............ 715/751 |
| 6,351,777 | B1 | * | 2/2002 | Simonoff ................ 709/250 |
| 6,507,865 | B1 | * | 1/2003 | Hanson et al. ........... 705/36 R |

OTHER PUBLICATIONS

Mosaic Design Team (1993). Group Annotations in NCSA Mosaic. Available on the Internet at: http://www.ncsa.uiuc.edu/SDG/Software/Mosaic/Docs/group-annotations.html. Sep. 1993.
Röscheisen, M., Mogensen, C. and Winograd, T. "Interaction design for shared World-Wide Web annotations", in Proceedings of CHI '95, Denver CO, vol. 2, pp. 328-329, May 1995.
Röscheisen, M., Mogensen, C. and Winograd, T. "Shared Web Annotations as a Platform for Third-Party Value-Added Information Providers: Architecture, Protocols, and Usage Examples". Technical Report STAN-CS-TR-97-1582, Stanford Integrated Digital Library Project, Computer Science Dept., Stanford University. Nov. 1994, updated Apr. 1995.

* cited by examiner

*Primary Examiner*—William L. Bashore
(74) *Attorney, Agent, or Firm*—Fay Sharpe LLP

(57) ABSTRACT

A system enables users at different locations (e.g. different geographic locations) to work collaboratively on a document, and to view each other's annotations to the document. Each user can work with a paper document, and make handwritten annotations to the paper document. The system includes a plurality of workstations communicating with a server. Each workstation comprises a document-imaging device, such as a camera, for generating a digital image of the document. Handwritten annotations are identified by image processing, and new annotations made by each user can be tracked in real time. Image bitmaps of the annotations are distributed by the server to each workstation so that each user can view other user's annotations. In one view, the annotations from different users are superimposed in a combined image.

22 Claims, 3 Drawing Sheets

METHOD AND APPARATUS FOR COLLABORATIVE ANNOTATION OF A DOCUMENT

BACKGROUND TO THE INVENTION

1. Field of the Invention

This invention relates to the field of facilitating collaborative annotation of a document. The invention is especially suitable for (but not limited to) permitting collaborative annotation of a document by users located at different geographical locations. The invention is also especially suitable for (but not limited to) use with a real-time conferencing system.

2. Description of Related Art

The main problem addressed by a collaborative annotation system is how to enable users located at different locations, for example different geographic sites, to annotate a common document, and to view each other's annotations.

This is especially desirable in a real-time environment, such that the users can work on the document together (for example in combination with a conferencing system, such as a video conferencing system).

U.S. Pat. No. 5,826,025 describes a system which supports collaborative annotations on Web pages. However, the system only permits annotations in the form of character sequences obtainable by a standard computer keyboard. In other words, each user has to enter the annotations using a keyboard.

U.S. Pat. No. 5,781,727 describes a system which permits annotations made by users at remote computers to appear on the displays of other participants. The system can be added to existing document sharing systems such as those described in U.S. Pat. Nos.: 5,220,657; 5,583,993; and 5,781,732. However, the annotations are restricted only to standard shapes, symbols and diagrams similar to those found in a graphics "paint" program.

U.S. Pat. No. 5,897,648 describes a collaborative annotation system which supports handwritten annotations. However, the system requires a special digitizer pen and an x-y digitizer base on which the paper document must be placed so that the annotations can be recorded and digitized. Such apparatus is expensive, and requires considerable desk space making it inconvenient to use. Additionally, all handwritten annotations have to be inputted using the digitizer, and so the system cannot deal with any documents which have already been annotated.

SUMMARY OF THE INVENTION

Broadly speaking, in contrast to the prior art, the invention provides a collaborative annotation technique in which users can make handwritten annotations to original paper documents. The invention provides a system in which each operator uses an image capture device is to capture a digital image of the document including any handwritten annotations, and the image is processed to extract images corresponding to the annotations. These extracted images are distributed to other users for display. Each user may therefore be able to view a combined image of the document on which all of the individual annotations are overlaid.

The invention thus improves on the prior art in several significant respects.

Firstly, the annotations are not limited to only special shapes, or keyboard entries. Almost any annotation can be accommodated in handwritten form.

Secondly, the system does not require an operator to use an expensive or space-consuming digitizer x-y device and pen to enter the annotations. Instead, the annotations are identified and extracted by processing a captured image of a document on which the annotations have been made.

Thirdly, each operator can make the annotations directly on a paper copy of the document. This is by far the most convenient technique for a user, because users still prefer to handle, and to make annotations on, a paper document rather than on an electronic representation of the document.

Additionally, when authors meet to discuss a document they are writing, they frequently work with paper drafts—annotating the parts of the document they plan to amend. The present invention can enable users to annotate documents in the way in which they are already most familiar, and automatically display the combined annotations from a plurality of users.

Preferably, each identified annotation is processed and stored as a data object. By separating the annotations in objects, the annotations can be independently manipulated.

Preferably, the system is able to update a user's display with any new annotations made by another user.

BRIEF DESCRIPTION OF THE DRAWINGS

A non-limiting embodiment of the invention will now be described, by way of example only, with reference to the accompanying drawings, in which:

FIGS. 4(a), (b) and (c) are schematic representations of annotations made to paper document by different users.

DETAILED DESCRIPTION

Figure 1:
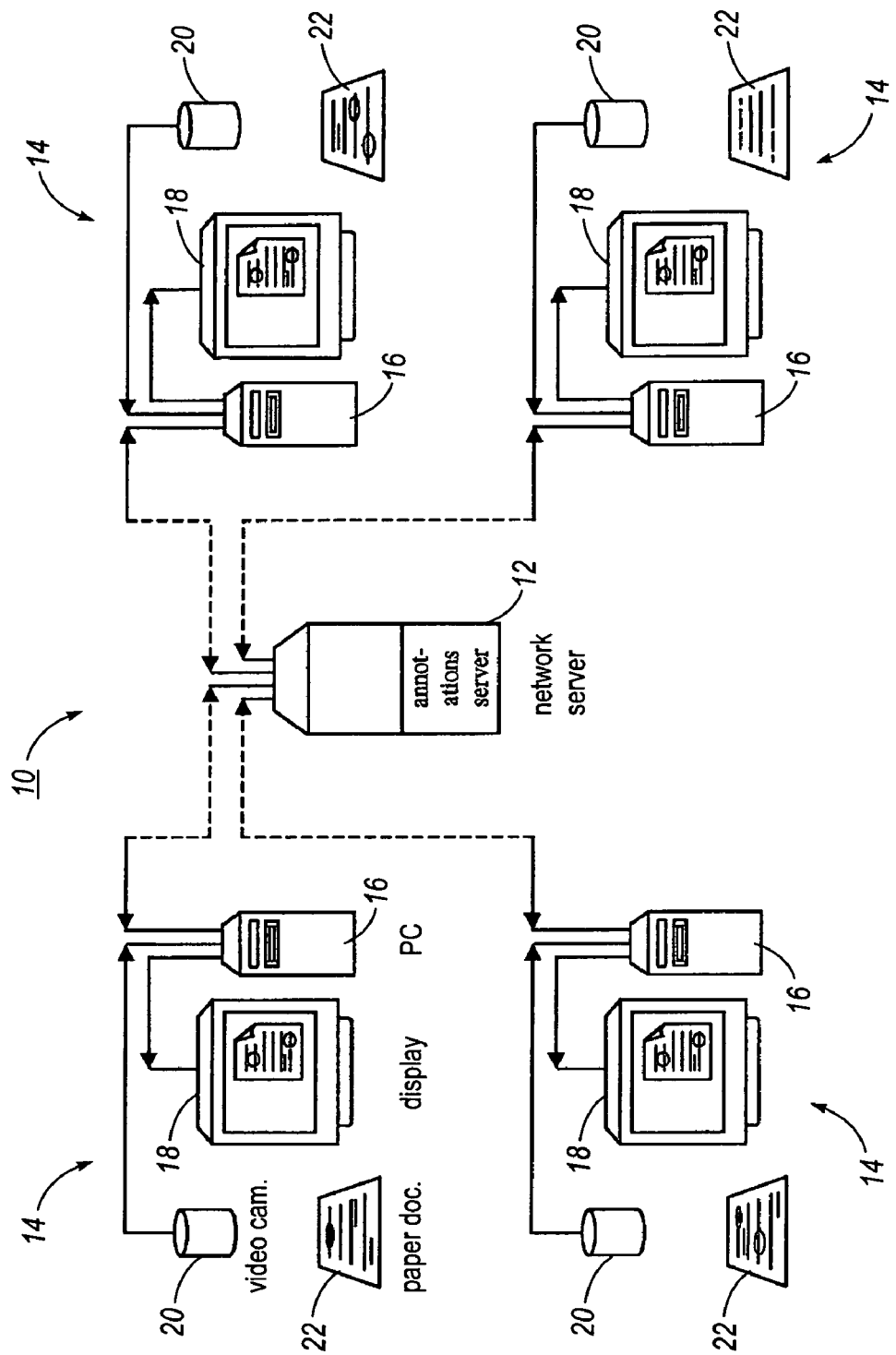
FIG. 1 is a schematic block diagram showing a collaborative annotation system.

Referring to FIG. 1, a collaborative annotation system 10 comprises a network server 12 communicating with a plurality of workstations 14. In this embodiment, four workstations 14 illustrated. However the number of workstations may be less, or it may be increased, to accommodate any number of users as desired.

The network server 12 may communicate with the workstations 14 by any suitable communications medium, including a telephone or other dial-up network, or a local area network, or a wireless network. The communication medium may include the Internet, or a video conferencing channel.

The relative locations of the workstations 14 is not important, as the workstations operate independently of each other. In particular, this embodiment enables the workstations to be at completely different geographical locations.

Each workstation comprises a computer processor 16, a display unit 18 and a document-imaging device 20. It is preferred that the imaging device 20 be a camera which can focus on a document 22 being worked on. However, any suitable imaging device, such as a scanner may be used; the user would then have to re-scan the document whenever he wished to update the image of the document.

In contrast to the prior art, one of the principles of this embodiment is that users can make handwritten annotations to a paper document, and the handwritten annotations from each user are extracted and combined with other user's annotations for distribution to each user. This provides the advantage that a user is able to work directly on the paper document, and the user can make any type of annotation he desires, as he is not limited only to specific electronic annotations.

Figure 2:
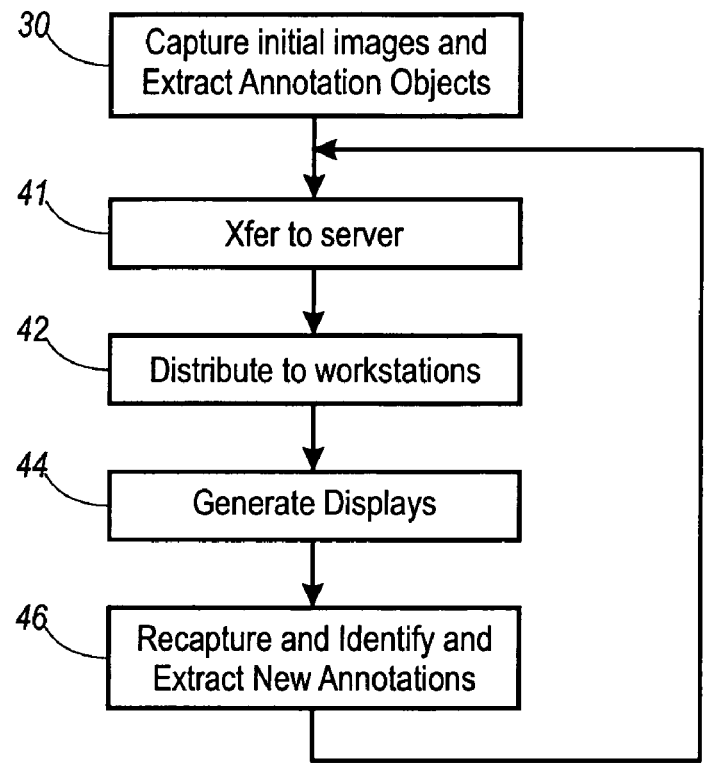
FIG. 2 is a schematic flow diagram illustrating operation of the system of FIG. 1.

FIG. 2 illustrates an overview of the system-wide operating method.

The system enables users to make handwritten annotations to a document prior to use with the collaborative annotations system. At a first step 30, each user operates the imaging device 20 to capture an image of the document 22, so that any existing annotations may be extracted. The extraction may either be performed locally at each workstation 14, or centrally on the server 12. Local identification of the annotations has the advantage that the processing may be performed "offline" before the workstation is coupled to the server 12 for a collaborative session.

The initial annotations may be identified by comparing each image with an original "clean" image without the annotations. However, this technique relies on having an accurate "clean" image for each user, which may prove difficult if each user has received the document electronically and might have printed it differently.

An alternative, more elaborate, technique is to use an algorithm for discriminating machine printed symbols from handwritten annotations on the basis of the image characteristics. Such a technique is described, for example, in U.S. Pat. No. 5,384,863, the teaching of which is incorporated herein by reference.

Figure 3:
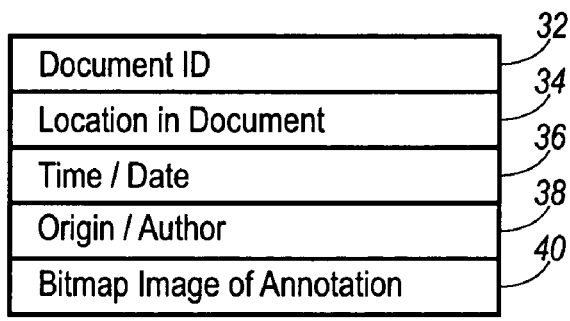
FIG. 3 is a schematic illustration of a data format representing an annotation object.

Each annotation is stored in the form of an "object", the format of which is illustrated in FIG. 3. Each object comprises: a document identifier 32 for identifying the image of the document on which the annotation was made; a location identifier 34 for identifying the location of the annotation in the image of the document; a time stamp 36 indicating the time and/or date the annotation was detected; an author identifier 38 for identifying the author (or at least the originating workstation) of the annotation; and a bitmap 40 of the annotation itself.

At step 41, if the annotation detection is performed locally, then the detected objects are transferred from each workstation 14 to the server 12 (or if the annotation detection is performed centrally, then the object information is already available at the server 12).

At step 42, the objects are communicated from the server 14 to each workstation 14, to make all the annotations available to all of the workstations for display.

At step 44, each workstation 14 generates a local display of the document with one or more of the annotations overlaid on the document image, according to display criteria for that workstation 14. The user may select viewing of all annotations, or only annotations made by one or more certain authors, or selected annotations according to time or date criteria. A preferred feature of the present embodiment is the ability to show annotations in different colors to distinguish between different authors or originating workstations. This provides an immediate indication of the author of each annotation, and can also enable similar or overlapping annotations to be distinguished more easily.

Figure 5:
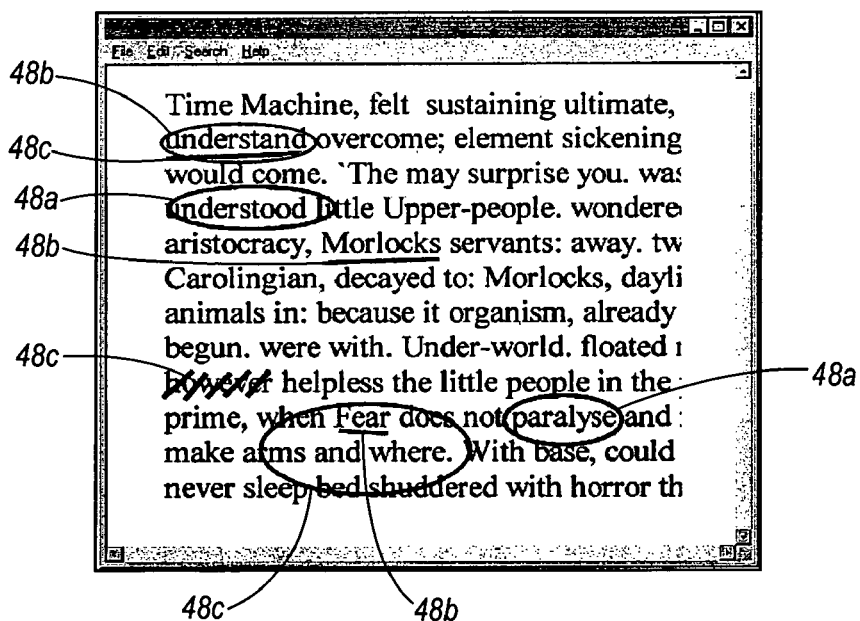
FIG. 5 is a combined view showing the combination of the annotations of FIGS. 4(a), (b) and (c)

FIGS. 4(a), (b) and (c) illustrate a document 22 which includes handwritten annotations 48a, 48b and 48c made by three different people. FIG. 5 shows how the annotations are combined when overlaid together for collaborative viewing. By showing the different annotations 48a, 48b, and 48c in different colors, the annotations are much easier to view and to distinguish individually.

If desired, a user can select a displayed annotation to retrieve associated information, for example, the time which the annotation was made (or detected), or the name of the person who made it.

At step 46, the system detects any new annotations made at each workstation in real time. At each workstation, the document may be imaged substantially continuously (or periodically) by means of a camera device. Alternatively, the operator at the workstation may decide when to scan a new image of a document in order to update any new annotations.

Again, the detection of annotations may be performed locally at each workstation 14 or centrally at the server 12 by communicating the captured image to the server 12. Real-time annotations may be detected by direct comparison of a newly captured image with a previously captured image to identify any new markings, which represent the new annotations. Additionally or alternatively, the algorithm referred to above may be used to identify new annotations by discriminating between handwritten markings and machine-printed marks.

Once the new annotations have been identified at step 46, the process returns to step 41 at which the new annotations are stored at the server 12 in the form of new annotation objects. The system then repeats the above-described method of distributing new annotation objects to the workstations 14 for local display in a collaborative display, and the process repeats to provide a continuous real-time update.

The present embodiment can therefore provide a substantially real time collaborative system, in which there is little, or no, perceptible delay between a user marking a document, and having that mark displayed to all users.

The present embodiment also permits non-handwritten annotations to be entered at a workstation, if desired. For example, keyboard entered annotations may be entered at a workstation. Additionally, an audio annotation (e.g. a voice message) may be recorded, and displayed as an icon at the desired place in the document. The audio annotation is played (reproduced) at any workstation 14 by a user clicking or otherwise selecting the icon in his display.

It will also be appreciated that by identifying and storing the annotations as objects, it is possible to "clean" an image of the document, even though the paper original contains handwritten annotations. In order to clean the image, it is necessary simply to remove all of the annotation bitmaps from the image. Such a process may be performed either locally at each workstation 14, or centrally at the server 12.

The invention, particularly as illustrated in the preferred embodiment, provides an extremely powerful and versatile collaborative annotation system, which can enable each user to work naturally on a paper copy of the document, without requiring each user to enter annotations using a keyboard, or using a complicated x-y digitizer pad and digitizing pen.

It will be appreciated that the foregoing description is merely illustrative of a preferred non-limiting embodiment of the invention. Those skilled in the art will be aware of many modifications and equivalents within the scope and spirit of the invention.

The invention claimed is:

1. A system for permitting collaborative annotation of a hardcopy document, the system comprising:
  a plurality of workstations each comprising a computer processor, a display, and a capture device for capturing a digital image of a hardcopy document; and
  a base computer communicating with the plurality of workstations;

wherein the system is operative to:
(a) identify handwritten annotations in digital images of the hardcopy document captured at each workstation;
(b) communicate data representing the identified annotation images to each workstation to permit an annotation entered at a first workstation to the hardcopy document and an annotation entered at a second workstation to the hardcopy document to be distributed to the plurality of workstations;
(c) use the data representing the identified annotations for display with the digital images of the hardcopy document at the plurality of workstations according to display criteria for each workstation; and
(d) display the digital images of the hardcopy document at the workstations with one or more of the identified annotations entered at the first and second workstations;
wherein the one or more of the annotations are selectively displayed in accordance with the display criteria for each workstation.

2. The system according to claim 1, wherein the system is operative to identify a new annotation made at a third workstation or an additional annotation made by the first or second workstations, and to update the distribution of annotations to the plurality of workstations.

3. The system according to claim 1, wherein the capture device at, at least one, workstation comprises a camera.

4. The system according to claim 1, wherein the data representing each identified annotation is stored in the form of an annotation object, the annotation object comprising:
(a) information representing the annotation as a bitmap; and
(b) information indicating the location of the annotation in a digital image of the hardcopy document.

5. The system according to claim 4, wherein the annotation object further comprises information representing the origin of the annotation.

6. The system according to claim 5, wherein at least one of the plurality of workstations is operative to display annotations in a plurality of different colors according to its display criteria, the color being indicative of the origin of the annotation.

7. The system according to claim 4, wherein the annotation object further comprises information representing at least one of a time and date associated with the annotation.

8. The system according to claim 4, wherein the annotation object further comprises information representing the identity of the digital image of the hardcopy document with which the annotation is associated.

9. The system according to claim 1, wherein each workstation is operative to identify handwritten annotations.

10. The system according to claim 1, wherein the base computer is operative to identify handwritten annotations.

11. The system according to claim 1, wherein the one or more of the annotations are selectable at each workstation for retrieving information associated with each selectively displayed annotation, including information concerning each annotation's creation and author.

12. A method for distributing annotations to a hardcopy document made at a plurality of workstation of a collaborative annotation system to other workstations in the system for display, comprising:
(a) capturing a digital image of the hardcopy document at each workstation;
(b) identifying a portion of the digital image corresponding to a handwritten annotation in the hardcopy document captured at a first workstation and a second workstation;
(c) distributing data representing the handwritten annotation to each workstation to permit the annotation entered at the first workstation to the hardcopy document and the annotation entered at a second workstation to the hardcopy document to be distributed to the plurality of workstations;
(d) using the data representing the identified annotations for display with the digital images of the hardcopy document at the plurality of workstations according to display criteria for each workstation; and
(e) displaying the digital images of the hardcopy document at the workstations with one or more of the identified annotations entered at the first and second workstations;
wherein the one or more of the annotations are selectively displayed in accordance with the display criteria for each workstation; and
wherein the one or more of the annotations are selectable at each workstation for retrieving information associated with each selectively displayed annotation, including information concerning each annotation's creation and author.

13. A method for permitting collaborative annotation of a hardcopy document in a system which comprises:
a plurality of workstations each comprising a computer processor, a display, and a capture device for capturing a digital image of a hardcopy document; and
a base computer communicating with the plurality of workstations;
wherein the method comprises:
(a) identifying handwritten annotations in digital images of the hardcopy document captured at each workstation;
(b) communicating data representing the identified annotation images to each workstation to permit an annotation entered at a first workstation to the hardcopy document and an annotation entered at a second workstation to the hardcopy document to be distributed to the plurality of workstations; and
(c) using the data representing the identified annotations for display with the digital images of the hardcopy document at the plurality of workstations according to display criteria for each workstation;
(d) displaying the digital images of the hardcopy document at the workstations with one or more of the identified annotations entered at the first and second workstations;
wherein the one or more of the annotations are selectively displayed in accordance with the display criteria for each workstation.

14. The method according to claim 13, further comprising identifying a new annotation made at a third workstation or an additional annotation made by the first or second workstations, and updating the distribution of annotations to the plurality of workstations.

15. The method according to claim 13, further comprising capturing an image at, at least one, workstation using a camera device.

16. The method according to claim 13, wherein each identified annotation is stored as annotation objects comprising:

(a) information representing the annotation as a bitmap; and (b) information indicating the location of the annotation in a digital image of the hardcopy document.

17. The method according to claim 16, wherein the annotation object further comprises information representing the origin of the annotation.

18. The method according to claim 16, wherein the annotation object further comprises information representing at least one of a time and date associated with each identified annotation.

19. The method according to claim 16, wherein the annotation object further comprises information representing the identity of the digital image of the hardcopy document with which the annotation is associated.

20. The method according to claim 13, further comprising selectively displaying, at a third workstation, a plurality of annotations originating from at least the first and second workstations.

21. The method according to claim 20, wherein each annotation is selectively displayed in a color indicative of the origin of the annotation according to the display criteria.

22. The method according to claim 13, wherein the one or more of the annotations are selectable at each workstation for retrieving information associated with each selectively displayed annotation, including information concerning each annotation's creation and author.

\* \* \* \* \*